Patented Jan. 18, 1949

2,459,742

UNITED STATES PATENT OFFICE 2,459,742

METAL BONDED BY MEANS OF CHLORINATED RUBBER ADHESIVES CONTAINING A POLYALKYLENE POLYAMINE

Harry P. Bradley, Cuyahoga Falls, and John L. Dum, Akron, Ohio, assignors to The Firestone Tire & Rubber Co., Akron, Ohio, a corporation of Ohio No Drawing. Application September 20, 1944, Serial No. 555,038

9 Claims. (Cl. 154—130)

This invention relates to chlorinated rubber adhesives, and more particularly to the improvement of the bond strength and solvent resistance of such adhesives.

Chlorinated rubber adhesives have come into very extensive use, particularly for adhering elastomeric compositions to metallic and other substrates. These adhesives are somewhat deficient in bond strength and resistance to solvents, and accordingly it has been proposed to remedy these defects by the addition of chemical agents variously termed "vulcanizers," "transfiers," "petronizers" and the like. While the proposed agents do improve the adhesives to some extent, they leave much to be desired, particularly in regard to the solvent resistance thereof. This last property is of great importance in many applications, such as the attachment of metallic fittings to elastomer-composition aircraft fuel cells, the lining of chemical and other processing equipment with elastomeric materials, and the like.

Accordingly, it is an object of this invention to provide chlorinated rubber adhesives capable of establishing strong and tenacious adhesive bonds with a wide variety of substances.

Another object is to provide such adhesives which will form adhesive bonds having a high degree of resistance to the action of solvents.

A further, more specific, object is to provide such adhesives which will form strong, tenacious and solvent-resistant bonds between elastomeric compositions and metallic and other substrates.

The above and other objects are secured, in accordance with this invention, by the incorporation, into chlorinated rubber adhesive compositions, of a modicum of a polyakylene polyamine having the formula:

$$NH_2-(-CR_2-CR_2-NH-)_n-CR_2-CR_2-NH_2$$

wherein

"$n$" is an integer from 1 to 4, and

"R," independently in each occurrence in the expanded formula, indicates hydrogen or a methyl, ethyl, or propyl group. The resultant compositions become converted, rapidly at high temperatures and more slowly at low temperatures, to a tough, strong, infusible and insoluble form capable of adhesively bonding a wide variety of materials. Without absolute commitment to this theory, it is thought probable that the conversion is due to a bridging between the chlorinated rubber molecules in accordance with the reaction:

wherein "Rub—Cl" indicates a segment of a chlorinated rubber chain, and the other symbols follow the notation set forth above. It is likewise possible that the secondary amino groups may likewise enter into similar reactions, thus providing three-way and higher multiplex bridgings between the chlorinated rubber molecules. Perhaps also the secondary amino groups serve to abstract and/or sequester the hydrogen chloride evolved as a result of the reaction.

The chlorinated rubbers employed in the adhesives of this invention are products well known to those skilled in the art, and hence an understanding of this invention requires no extended description of these materials or their preparation. Such products are exemplified in commercial products such as "Parlon" and "Duron" (trade names respectively of the Hercules Powder Company and The Firestone Tire & Rubber Company) and are commonly manufactured by introducing chlorine into solvent solutions of natural rubber. The chlorine adds on at the double bonds, and to some extent replaces hydrogen, in the rubber molecule, the chlorine content of the product usually being on the order of 66%.

The chlorinated rubbers just referred to as being suitable for the practice of this invention are produced from natural rubber. However, closely similar materials suitable for the practice of this invention may be produced by appropriate chlorination of other natural and synthetic elastomers such as gutta percha, balata, polychloroprene, polybutadiene, elastomeric copolymers of butadiene and styrene, elastomeric copolymers of butadiene and acrylonitrile, and the like. It is to be understood that adhesives prepared from the chlorinated products of any of these base elastomers may be improved in accordance with this invention.

Likewise, the preparation of the chlorinated rubbers has been discussed in connection with processes in which gaseous chlorine is introduced into solutions of rubber and other elastomers. Equally suitable materials may likewise be prepared by contacting solid rubber or other elastomer, in sheet or other form preventing large superficial area in relation to bulk, to liquid or gaseous chlorine in accordance with known procedures.

Coming now to the polyalkylene polyamines employed in this invention, as above noted, these may be any compounds having the formula:

$$NH_2-(-CR_2-CR_2-NH-)_n-CR_2-CR_2-NH_2$$

wherein

"$n$" is an integer from 1 to 4, and

"R" independently in each occurrence in the expanded formula, represents hydrogen or a methyl, ethyl or propyl group.

To illustrate the application of the formula, assume that "n" is 3, in which case the expanded formula will be:

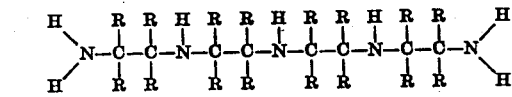

Any of the substituents indicated by "R" can be hydrogen or a methyl, ethyl or propyl group, irrespective of the substituents indicated by "R" elsewhere in the formula, thus:

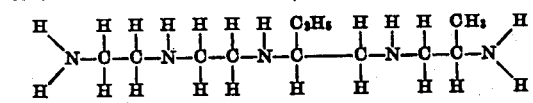

or

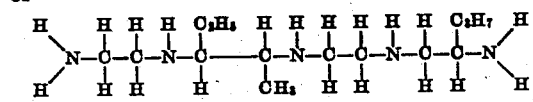

Suitable compounds will thus be seen to include, inter alia, diethylene triamine, triethylene tetramine, tetraethylene pentamine, pentaethylene hexamine, tripropylene tetramine, compounds on the order of

and

and the like. Those acquainted with the art will recognize these compounds as being products derived from low molecular weight monoolefins via chlorine addition and condensation with ammonia. All of these compounds are operable in the practice of this invention; however, especially satisfactory results are obtained with compounds in which "n" in the formula above is 3 or 4, and in which the substituents indicated by "R" are largely hydrogen atoms, examples of this preferred type of compounds being tetraethylene pentamine and pentaethylene hexamine.

In general, the most satisfactory improvement in the properties of chlorinated rubber adhesives are obtained by the use of approximately 3% of the polyalkylene polyamine, based on the weight of chlorinated rubber. However, such adhesives are definitely improved in strength and solvent resistance by the use of quantities as low as 1% of polyalkylene polyamine. Quantities greater than 3%, such as 5%, may be used, but will ordinarily be found wasteful.

In commercial practice, chlorinated rubber adhesives are prepared as solvent solutions or "cements" which are coated upon one or both of the surfaces to be adhered, and dried. The surfaces to be adhered are then pressed together, preferably with application of heat to effect flow and contact of the adhesive and also, when one of the surfaces to be adhered is an unvulcanized elastomeric composition, to vulcanize the elastomer. A strong adhesive bond results. Such commercial processes are readily adapted to the practice of this invention by incorporating a suitable quantity of the polyalkylene polyamine into the adhesive cement. Certain modifications of the regular procedures will be found advantageous, however, and these modifications will now be described.

Chlorinated rubber cements containing polyalkylene polyamines according to this invention become unworkable after a certain length of time, due to insolubilization of the chlorinated rubber and consequent formation of an intractable gel. This period is generally on the order of 8 to 10 hours. Accordingly, the cements should be made up in batches of size such that they will be completely used before gelation. A convenient way of accomplishing this result is to make up large batches of stock cements, containing all appropriate ingredients except the polyalkylene polyamine, and to mix small lots of these stock cements with the polyalkylene polyamines as required.

It has also been observed that the type of solvent used in the cements somewhat affects the adhesive bonds obtained in accordance with this invention. In general, superior results are obtained by the use of aromatic solvents such as toluene, benzene and the like, as compared with non-aromatic solvents such as methyl ethyl ketone. It has also been observed that ester-type solvents such as methyl, ethyl, propyl and butyl acetates, propionates, butyrates, lactates, etc., somewhat retard the gelation of cements according to this invention, and use may be made of this fact when it is desired to provide cements which will remain workable for longer periods of time.

Another advantageous technique involves baking, at temperatures between about 100° and 160° C., the dried coating of adhesive before juxtaposing and curing the surfaces to be adhered. Somewhat improved strength and solvent resistance of the adhesive bond are thereby attained.

The invention has been described largely in connection with processes in which the chlorinated rubber adhesive and polyalkylene polyamine are dissolved together in a solvent to form a cement, and in most cases this would be the most convenient mode of execution of this invention. However, a chlorinated rubber adhesive, not containing any polyalkylene polyamine, might be applied to the one or both of the surfaces to be adhered, and thereafter subjected to the action of a polyalkylene polyamine. The application of the adhesive could be by brushing, dipping, spraying, rolling, or by plying of a separate preformed adhesive-containing film or web; and the polyalkylene polyamine could be supplied in liquid or vapor form and allowed to diffuse into the adhesive layer.

While the addition, in accordance with this invention, of polyalkylene polyamines greatly improves the properties of chlorinated rubber adhesives, such addition has been found in no way to interfere with the performance of the adhesives in any applications in which they have heretofore been employed. The adhesives of this invention are capable of forming adhesive bonds with a wide variety of materials such as aluminum and its alloys; steel; zinc-plated, galvanized, Sherardized, Parkerized and cathodized steel; zinc and its alloys; magnesium and its alloys; plastics; textile fabrics; paper and fiber board; and elastomeric materials such as rubber, gutta percha, balata, polychloroprene, polybutadiene, elastomeric copolymers of butadiene and styrene, elastomeric copolymers of butadiene and acrylonitrile, and the like. The practice of this invention is of particular advantage in the adhering of highly solvent-resistant elastomers such as the butadiene-acrylonitrile elastomeric copolymers; such copolymers may be assembled by the use of adhesives in accordance with this invention, and used in applications taking the fullest advantage of the solvent-resistant qualities of the copolymers, without fear of adhesive failure. Examples of such uses are in the adhering of metal and other fittings to butadiene-acrylonitrile elastomer composition fuel cells for aircraft; and in the lining of chemical and process equipment with membranes of chemical- and solvent-resistant elastomeric compositions.

With the foregoing general discussion in mind, there are given herewith detailed specific examples of the practice of this invention. All parts given are by weight.

EXAMPLE I

Cements prepared: Parts
  Chlorinated rubber, (chlorine content 66%; viscosity 20 cps in 20% toluene solution) _____ 100
  Solvent, (toluene or methyl ethyl ketone) _____ 366
  Polyalkylene polyamine, (diethylene triamine, triethylene tetramine, or tetraethylene pentamine) _____ 3
Elastomer adhered:
  Copolymer of 55% butadiene with 45% acrylonitrile.
Metal adhered:
  Aluminum Solvent resistance test medium: Volumes
  100-octane aviation gasoline_____ 60
  Toluene_____ 20
  Xylene_____ 15
  Benzene_____ 5

A series of cements was prepared in accordance with the foregoing schedule, using various combinations of the solvents and polyalkylene polyamines listed. Each cement was used to prepare a set of test assemblies each comprising a strip of the elastomer adhered to a strip of the aluminum. These test assemblies were immersed in the solvent resistance test medium for varying periods of time to determine the solvent resistance thereof. Particulars of the preparation of the test structures and tests conducted thereon are given herewith, and the results are summarized below in Table I.

PREPARATION OF ALUMINUM STRIPS

The surfaces of the aluminum strips to which the elastomer strips were to be adhered were preliminarily prepared as follows:

1. Sandblasted
2. Degreased in a carbon tetrachloride vapor bath
3. Etched in 3% sodium hydroxide solution for 20 seconds at 75° C.
4. Rinsed in hot water
5. Dipped in 50% nitric acid solution to remove any black deposit
6. Rinsed in hot tap water
7. Rinsed in hot distilled water
8. Dipped in ethanol
9. Dried at 105° C. for 15 minutes.

ADHESION PROCEDURE

The prepared aluminum strips were coated with the various cements, dried and preheated for one hour at either 110° C. or 150° C. as indicated for particular cases in the Table I hereafter. The strips of elastomer were then plied upon the prepared and coated surfaces of the aluminum strips, and the assemblies cured in a press at 150° C. for 30 minutes.

TESTS AND TEST ASSEMBLIES

Each test assembly comprised a strip of the butadiene-acrylonitrile elastomer 3" x 1" x ½" adhered to a 3" x 1" x ⅛" aluminum strip, the adhesion being between the 3" x 1" faces of the elastomer and metal strip. Adhesive was omitted from a 1" square at one end of the juxtaposed surfaces to leave a free flap of elastomer. The test assembly, after immersion for a predetermined period in the Solvent Resistance Test Medium, was placed in a tensile pulling machine arranged to pull the free flap of elastomer in a direction parallel to the surface of the metal strip and away from the end of the assembly from which the adhesive was omitted. Pulling was at the rate of 4" per minute, and the adhesive efficiency was recorded as the percentage of the cross-sectional area of the elastomer strip which tore instead of peeling away from the aluminum strip. The compositions of the cements and the preheating temperatures used in preparing the test assemblies, together with the results of tests conducted thereon, are tabulated herewith.

*Table I*

| Item | Composition of Cement | | Temperature of Preheat | Adhesive Efficiency, Per cent After Immersion in Solvent Resistance Test Medium for— | | | | |
|---|---|---|---|---|---|---|---|---|
| | Polyalkylene Polyamine Used | Solvent Used | | 0 Days | 1 Day | 2 Days | 7 Days | 35 Days |
| | | | ° C. | | | | | |
| 1 | Diethylene triamine | Toluene | 150 | 95 | 95 | 100 | 90 | 90 |
| 2 | Triethylene tetramine | ___do___ | 150 | 90 | 90 | 90 | 85 | 80 |
| 3 | Tetraethylene pentamine | ___do___ | 150 | 100 | 100 | 100 | 100 | 100 |
| 4 | Diethylene triamine | Methyl ethyl ketone | 110 | 70 | 70 | 70 | 70 | 70 |
| 5 | ___do___ | Toluene | 110 | 95 | 95 | 95 | 95 | 95 |
| 6 | Triethylene tetramine | Methyl ethyl ketone | 110 | 60 | 70 | 60 | 50 | 60 |
| 7 | ___do___ | Toluene | 110 | 95 | 100 | 90 | 90 | 90 |
| 8 | Tetraethylene pentamine | Methyl ethyl ketone | 110 | 95 | 95 | 95 | 95 | 95 |
| 9 | ___do___ | Toluene | 110 | 100 | 100 | 100 | 100 | 100 |

From an inspection of the table it is evident that, while lower polyalkylene polyamines such as diethylene triamine (items #1, 2 & 4–7) do exert a very effective hardening and insolublizing effect, higher amines such as tetraethylene pentamine are definitely more effective and reliable (items Nos. 3, 8 & 9). Slightly superior results should also be noted where toluene (items 1–3, 5, 7 and 9) is used as a solvent for the cement, in comparison with methyl ethyl ketone (items Nos. 4, 6 and 8). Likewise, the procedures involving a preheat at 110° C. (items Nos. 4–9) result in somewhat superior products to those obtained by preheating at 150° C. (items Nos. 1–3).

EXAMPLE II

| | Parts |
|---|---|
| Chlorinated rubber (as in Example I) | 100 |
| Tetraethylene petamine | 3 |
| Carbon black | 5 |
| Toluene | 500 |

An aluminum aircraft fuel cell hand-hole fitting was prepared as follows:

1. Sandblasted
2. Degreased
3. Etched for 2 minutes at 70° C. in a solution comprising:
   Nitric acid (concentrated), 93 parts
   Potassium dichromate, 89 parts
   Water, 368 parts
4. Washed in hot tap water
5. Rinsed in boiling distilled water
6. Dipped in ethanol
7. Dried at 110° C.

The aluminum fitting was coated with a cement prepared from the ingredients set forth at the beginning of this example. The coated fitting was then preheated at 110° C. for one hour, and plies of a butadiene acrylonitrile elastomer were built around the fitting. The assembly was then cured in a press at 150° C. for 40 minutes. The cured assembly was immersed in aromatic aviation fuel for 4 weeks, at the end of which time the adhesive bond remained unaffected.

EXAMPLE III

| | Parts |
|---|---|
| Chlorinated rubber | 100 |
| Tetraethylene pentamine | 1 or 3 |
| Toluene | 400 |

Two cements were made up in accordance with the foregoing schedule, one employing one part, and the other employing three parts, of tetraethylene pentamine. Samples of a butadiene acrylonitrile elastomer were adhered to steel bars by means of these cements, in accordance with the following procedure:

PREPARATION OF STEEL BARS

A number of steel bars was prepared as follows:

1. Degreased
2. Etched for two minutes at 70° C. in 10% sulfuric acid solution
3. Rinsed in hot tap water
4. Rinsed in boiling distilled water
5. Dipped in alcohol
6. Dried for 15 minutes at 110° C.

ADHESION PROCEDURE

The prepared steel bars were coated with one or the other of the adhesive cements described above, dried and preheated for one hour at 110° C. The butadiene acrylonitrile elastomer samples were then plied upon the steel bars, and the assemblies press-cured at 150° C. for 35 minutes. All the cured assemblies had excellent adhesion as removed from the press, failure in all instances occurring by tear of the elastomer stock rather than by peeling from the surfaces of the bars. Some of the assemblies were also immersed in aromatic aviation fuel for ten weeks. At the end of this time the assemblies with cements containing only one part of tetraethylene pentamine had somewhat impaired adhesion, but those assemblies prepared with cements containing three parts of tetraethylene pentamine retained their original strength intact.

EXAMPLE IV

A steel aircraft fuel-cell gauge-glass fitting sherardized to a depth of .003" was cleaned and etched as follows:

1. Sandblasted
2. Degreased
3. Etched for 20 seconds at 70° C. in a solution comprising:
   Nitric acid (concentrated), 93 parts
   Potassium dichromate, 89 parts
   Water, 368 parts
4. Washed in hot tap water
5. Rinsed in boiling distilled water
6. Dipped in ethanol
7. Dried at 110° C.

The cleaned fitting was coated with the cement of Example II, dried, and preheated at 110° C. for an hour. Plies of a butadiene-acrylonitrile elastomer were built around the fitting, and the assembly was press cured at 150° C. for 45 minutes.

The cured assembly was then built up with plies of uncured elastomer composition to form an aircraft fuel cell. The entire cell was steam-cured in an autoclave. The adhesion of the fitting was unaffected by the steam curing process, and was permanently resistant to attack by aromatic and other organic solvents.

EXAMPLE V

The cement and procedure of Example II was employed for the purpose of adhering each of the elastomers to each of the substrates listed herewith.

| Elastomers | Substrates |
|---|---|
| Butadiene-acrylonitrile copolymers. | Galvanized steel. |
| Neoprene. | Zinc plated steel. |
| | Nickel plated steel. |
| | Cadmium plated steel. |
| | Cathodically cleaned steel. |
| | Parkerized steel. |
| | Die-cast zinc. |
| | Magnesiumalloy. |
| | Phenol formaldehyde laminate. |
| | Wood. |
| | Paper. |
| | Fiber board. |

Satisfactory adhesion was obtained in every case.

From the foregoing general discussion and detailed examples, it will be seen that this invention provides novel and improved rubber chloride cements having greatly improved mechanical strength, and chemical and solvent resistance. The invention may be practiced without any substantial interference with established procedures and schedules, and with the use of the cheap and reliably procurable polyalkylene polyamines.

What is claimed is:

1. Process of adhering an elastomer to a metallic substrate which comprises interposing, between said elastomer and substrate, a composition comprising chlorinated rubber and from about 1% to about 5%, based on the weight of chlorinated rubber, of a polyalkylene polyamine having the formula $$NH_2-(-CR_2-CR_2-NH-)_n-CR_2-CR_2-NH_2$$

wherein "R," independently in each occurrence in the expanded formula, represents a substituent chosen from the class consisting of hydrogen, and methyl, ethyl and propyl groups, and "$n$" is an integer from 1 to 4, and curing the assembly by means of heat.

2. Process of adhering an elastomer to a metallic substrate, which comprises interposing, between said elastomer and substrate, a composition comprising chlorinated rubber and from about 1% to about 5%, based on the weight of chlorinated rubber, of diethylene triamine, and curing the assembly by means of heat.

3. Process of adhering an elastomer to a metallic substrate, which comprises interposing, between said elastomer and substrate, a composition comprising chlorinated rubber and from about 1% to about 5%, based on the weight of chlorinated rubber, of triethylene tetramine, and curing the assembly by means of heat.

4. Process of adhering an elastomer to a metallic substrate, which comprises interposing, between said elastomer and substrate, a composition comprising chlorinated rubber and from about 1% to about 5%, based on the weight of chlorinated rubber, of tetraethylene pentamine, and curing the assembly by means of heat.

5. Process of establishing a solvent resistant bond between a metallic substrate and an elastomeric copolymer of butadiene and acrylonitrile, which comprises interposing, between the substrate and copolymer, a composition comprising chlorinated rubber and from about 1% to about 5%, based on the weight of chlorinated rubber, of a polyalkylene polyamine having the formula $$NH_2-(-CR_2-CR_2-NH)_n-CR_2-CR_2-NH_2$$

in which "R," independently in each occurrence in the expanded formula, represents a substituent selected from the class consisting of hydrogen and methyl, ethyl, and propyl groups, and "$n$" represents an integer from 1 to 4, and curing the assembly by means of heat.

6. Process of establishing a solvent resistant bond between a steel substrate and an elastomeric copolymer of butadiene and acrylonitrile, which comprises interposing, between said substrate and elastomeric copolymer, a composition comprising chlorinated rubber and from about 1% to about 5%, based on the weight of chlorinated rubber, of tetraethylene pentamine, and curing the assembly by means of heat.

7. An adhered structure comprising an elastomer, a metallic substrate and an interposed heat-cured adhesive layer comprising chlorinated rubber and from about 1% to about 5%, based on the weight of chlorinated rubber, of a polyalkylene polyamine having the formula $$NH_2-(-CR_2-CR_2-NH-)_n-CR_2-CR_2-NH_2$$

wherein "R," independently in each occurrence in the expanded formula, represents a substituent chosen from the class consisting of hydrogen and methyl, ethyl and propyl groups, and "$n$" represents an integer from 1 to 4.

8. A solvent-resistant adhered structure comprising a steel substrate, an elastomeric copolymer of butadiene and acrylonitrile, and an interposed heat-cured adhesive layer comprising chlorinated rubber and from about 1% to about 5%, based on the weight of chlorinated rubber, of tetraethylene pentamine.

9. Process of adhering an elastomer to a metallic substrate which comprises coating the metallic substrate with a solvent cement comprising chlorinated rubber and from about 1% to about 5%, based on the weight of chlorinated rubber, of a polyalkylene polyamine having the formula $$NH_2-(-CR_2-CR_2-NH)_n-CR_2-CR_2-NH_2$$

wherein "R" independently in each occurrence in the expanded formula, represents a substituent chosen from the class consisting of hydrogen and methyl, ethyl and propyl groups, and $n$ is an integer from 1 to 4, drying the cement coating, baking the dried coating at from 100° C. to 160° C., superposing the elastomer upon the baked coating, and curing the assembly by means of heat.

HARRY P. BRADLEY.
JOHN L. DUM.

REFERENCES CITED

The following references are of record in the file of this patent:

UNITED STATES PATENTS

| Number | Name | Date |
|---|---|---|
| 1,973,676 | Voorhees | Sept. 11, 1934 |
| 2,046,986 | Winkelmann | July 7, 1936 |
| 2,148,831 | Raynolds | Feb. 28, 1939 |
| 2,281,436 | Hershberger | Apr. 28, 1942 |
| 2,304,637 | Hardy | Dec. 8, 1942 |
| 2,344,776 | Halse | Mar. 21, 1944 |

FOREIGN PATENTS

| Number | Country | Date |
|---|---|---|
| 481,396 | Great Britain | Mar. 10, 1938 |
| 702,172 | Germany | Jan. 31, 1941 |

Certificate of Correction

Patent No. 2,459,742.        January 18, 1949.

HARRY P. BRADLEY ET AL.

It is hereby certified that errors appear in the printed specification of the above numbered patent requiring correction as follows:

Column 2, line 45, for the word "preventing" read *presenting*; column 7, line 6, Example II, for "petamine" read *pentamine*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*